US011062692B2

(12) United States Patent
Lombardo et al.

(10) Patent No.: US 11,062,692 B2
(45) Date of Patent: Jul. 13, 2021

(54) GENERATION OF AUDIO INCLUDING EMOTIONALLY EXPRESSIVE SYNTHESIZED CONTENT

(71) Applicant: Disney Enterprises, Inc., Burbank, CA (US)

(72) Inventors: Salvator D. Lombardo, Glendale, CA (US); Komath Naveen Kumar, Los Angeles, CA (US); Douglas A. Fidaleo, Canyon Country, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/579,663

(22) Filed: Sep. 23, 2019

(65) Prior Publication Data

US 2021/0090549 A1 Mar. 25, 2021

(51) Int. Cl.
*H04L 29/06* (2006.01)
*H04N 19/00* (2014.01)
*G10L 13/047* (2013.01)
*G10L 25/18* (2013.01)

(52) U.S. Cl.
CPC ............ *G10L 13/047* (2013.01); *G10L 25/18* (2013.01)

(58) Field of Classification Search
CPC ................................ H04L 29/06; H04N 19/00
See application file for complete search history.

(56) References Cited

U.S. PATENT DOCUMENTS 9,118,744 B2 * 8/2015 Nagaraj ................ H04L 65/608
9,336,777 B2 5/2016 Gomez
9,865,249 B2 1/2018 Talwar
10,008,216 B2 6/2018 Yassa
10,068,557 B1 9/2018 Engel
10,140,973 B1 11/2018 Dalmia
10,740,064 B1 * 8/2020 Reddy ..................... G06F 3/165
2002/0007371 A1 * 1/2002 Bray .................. H04N 21/4435 715/205

(Continued)

FOREIGN PATENT DOCUMENTS

WO 02069323 9/2002

OTHER PUBLICATIONS

Nuance Communications, Inc. "Vocalizer 7: Advanced TTS for IVR and Mobile," Jan. 12, 2018. pp. 1-2.

(Continued)

*Primary Examiner* — Shreyans A Patel
(74) *Attorney, Agent, or Firm* — Farjami & Farjami LLP

(57) ABSTRACT

An audio processing system for generating audio including emotionally expressive synthesized content includes a computing platform having a hardware processor and a memory storing a software code including a trained neural network. The hardware processor is configured to execute the software code to receive an audio sequence template including one or more audio segment(s) and an audio gap, and to receive data describing one or more words for insertion into the audio gap. The hardware processor is configured to further execute the software code to use the trained neural network to generate an integrated audio sequence using the audio sequence template and the data, the integrated audio sequence including the one or more audio segment(s) and at least one synthesized word corresponding to the one or more words described by the data.

20 Claims, 6 Drawing Sheets

(56) References Cited

U.S. PATENT DOCUMENTS

| | | | | |
|---|---|---|---|---|
| 2007/0192105 | A1* | 8/2007 | Neeracher | G10L 13/08 704/258 |
| 2013/0323689 | A1* | 12/2013 | Bates | G09B 5/04 434/167 |
| 2018/0342258 | A1 | 11/2018 | Huffman | |
| 2020/0342138 | A1* | 10/2020 | Ju | G06F 40/295 |

OTHER PUBLICATIONS

Thakur, Suresh Kumar, et al. "Study of Various kinds of Speech Synthesizer Technologies and Expression for Expressive Text to Speech Conversion System," *IJAEST*, vol. 8, Issue 2, 2011. pp. 301-305.

* cited by examiner

GENERATION OF AUDIO INCLUDING EMOTIONALLY EXPRESSIVE SYNTHESIZED CONTENT

BACKGROUND

The development of machine learning models for speech synthesis of emotionally expressive voices is challenging due to extensive variability in speaking styles. For example, the same word can be enunciated within a sentence in a variety of different ways to elicit unique characteristics, such as the emotional state of the speaker. As a result, training a successful model to generate a full sentence of speech typically requires a very large dataset, such as twenty hours or more of prerecorded speech.

Even when conventional neural speech generation models are successful, the speech they generate is often not emotionally expressive due at least in part to the fact that the training objective employed in conventional solutions is regression to the mean. Such a regression to the mean training objective encourages the conventional model to output a "most likely" averaged utterance, which tends not to sound convincing to the human ear. Consequently, expressive speech synthesis is usually not successful and remains a largely unsolved problem in the art.

SUMMARY

There are provided systems and methods for generating audio including emotionally expressive synthesized content, substantially as shown in and/or described in connection with at least one of the figures, and as set forth more completely in the claims.

DETAILED DESCRIPTION

Figure 1:
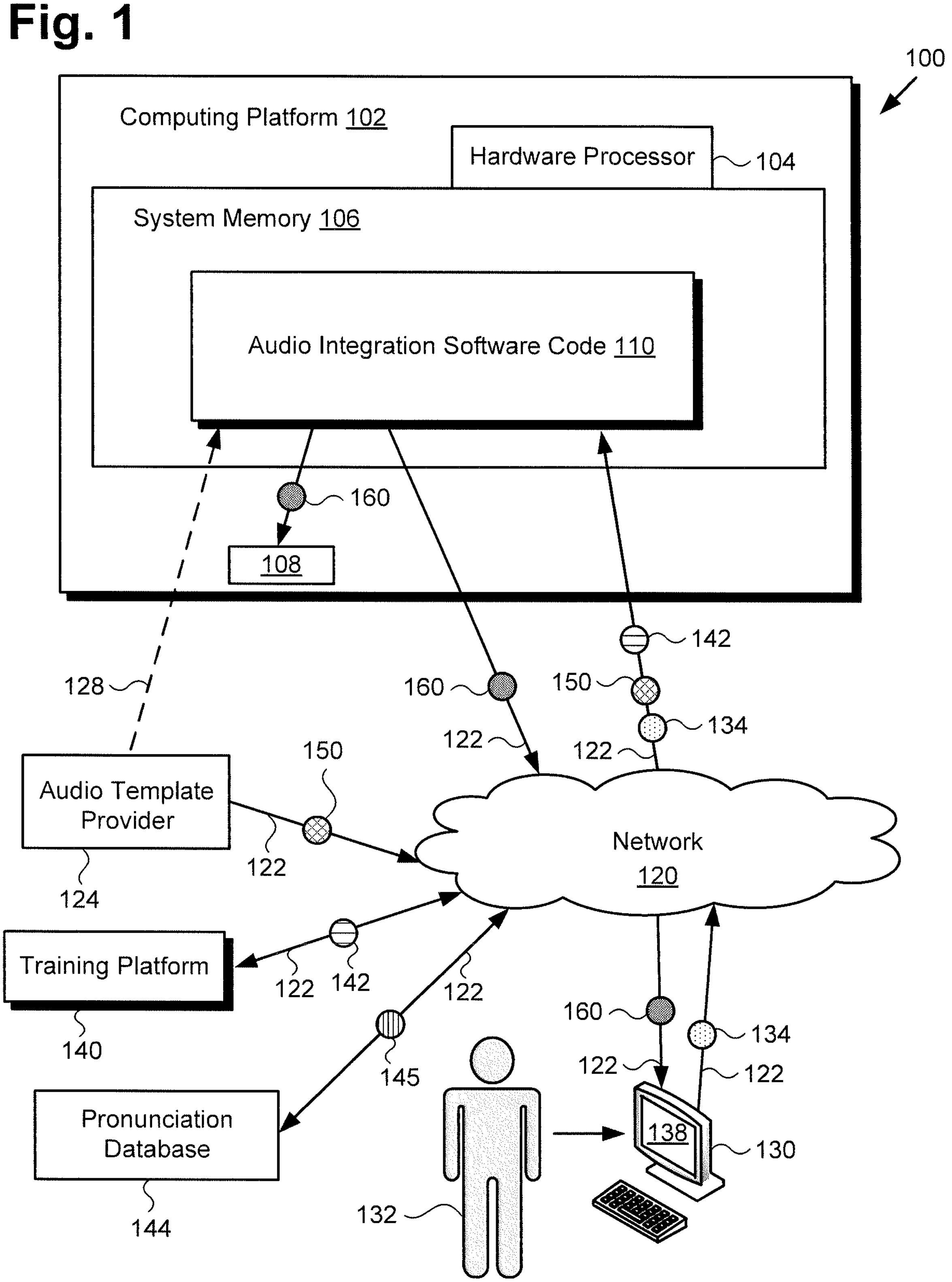
FIG. 1 shows a diagram of an exemplary system for generating audio including emotionally expressive synthesized content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated systems and methods for generating audio including emotionally expressive synthesized content using a trained neural network that overcomes the drawbacks and deficiencies in the conventional art. It is noted that, as used in the present application, the terms "automation," "automated", and "automating" refer to systems and processes that do not require the participation of a human user, such as a human editor. Although, in some implementations, a human editor may review the synthesized content generated by the automated systems and according to the automated methods described herein, that human involvement is optional. Thus, the methods described in the present application may be performed under the control of hardware processing components of the disclosed automated systems.

It is further noted that, as defined in the present application, a neural network (NN), also known as an artificial neural network (ANN), is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve their performance of a specific task as new data is received and/or adapt to new patterns of a dynamic system. As such, various forms of NNs may be used to make predictions about new data based on past examples or "training data." In various implementations, NNs may be utilized to perform image processing or natural-language processing.

FIG. 1 shows a diagram of an exemplary system for generating audio including emotionally expressive synthesized content using a trained NN in an automated process, according to one implementation. As shown in FIG. 1, audio processing system 100 includes computing platform 102 having hardware processor 104, system memory 106 implemented as a non-transitory storage device storing audio integration software code 110, and may include audio speaker 108.

Figure 3:
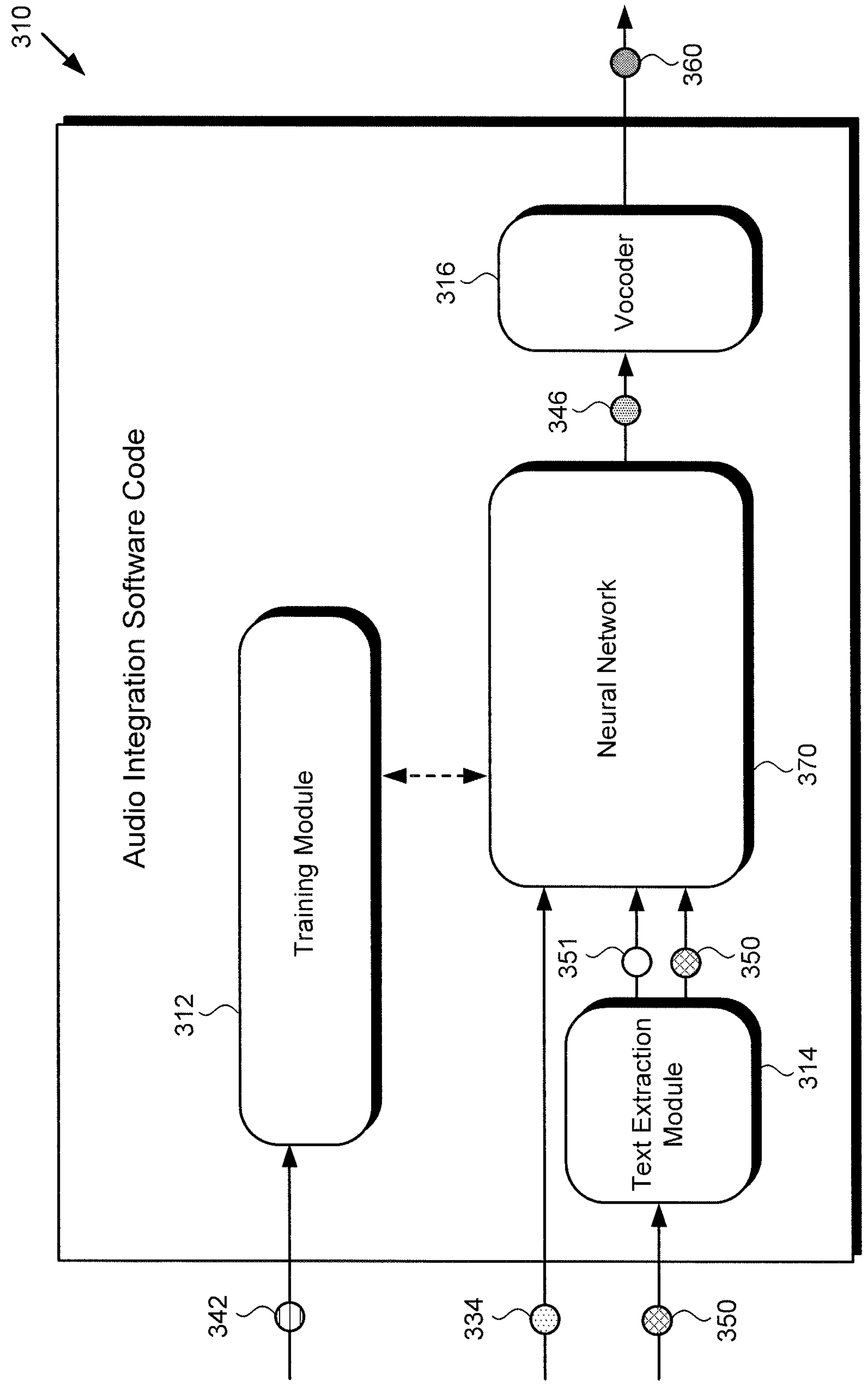
FIG. 3 shows an exemplary audio integration software code including a neural network suitable for use by the system shown in FIG. 1, according to one implementation.
Figure 4:
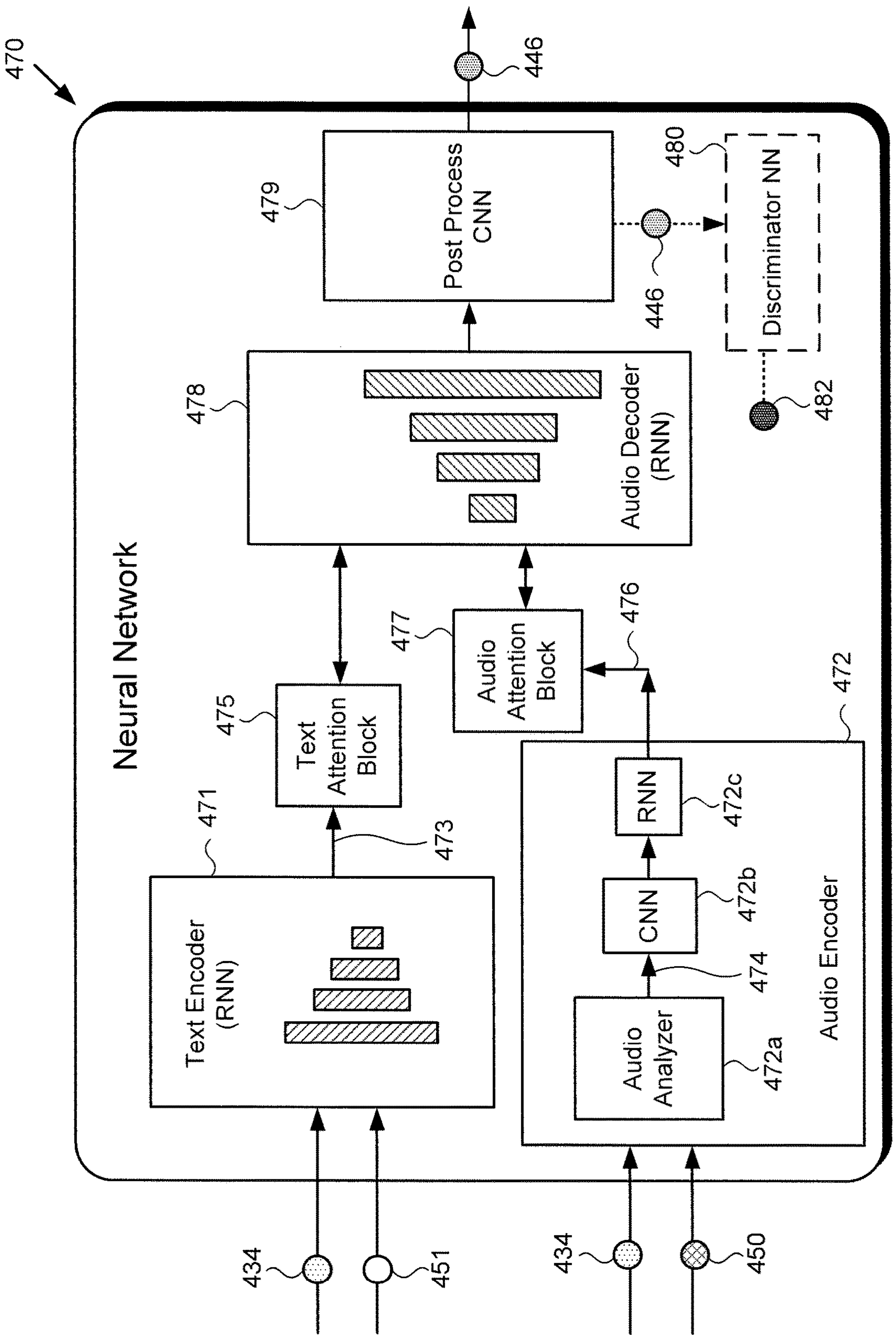
FIG. 4 shows a more detailed diagram of the neural network shown in FIG. 3, according to one exemplary implementation.

It is noted that, as shown by FIGS. 3 and 4 and described below, audio integration software code 110 includes an NN, which may be implemented as a neural network cascade including multiple NNs in the form of one or more convolutional neural networks (CNNs), one or more recursive neural networks (RNNs), and one or more discriminator NNs, for example, as each of those features is known in the art. As also described in greater detail below, audio processing system 100 utilizes audio integration software code 110 including the trained NN to generate integrated audio sequence 160.

As shown in FIG. 1, audio processing system 100 is implemented within a use environment including audio template provider 124 providing audio sequence template 150, training platform 140 providing training data 142, pronunciation database 144, communication network 120, and editor or other user 132 (hereinafter "user 132") utilizing user system 130 including audio speaker 138. In addition, FIG. 1 shows network communication links 122 communicatively coupling audio template provider 124, training platform 140, pronunciation database 144, and user system 130 with audio processing system 100 via communication network 120.

Also shown in FIG. 1 is pronunciation exemplar 145 obtained from pronunciation database 144, as well as descriptive data 134 provided by user 132. It is noted that pronunciation database 144 may include a pronunciation NN model that can output pronunciations of words not stored in pronunciation database 144. Moreover, in some implementations, pronunciation database 144 may be configured to provide multiple different pronunciations of the same word.

It is further noted that although audio processing system 100 may receive audio sequence template 150 from audio template provider 124 via communication network 120 and network communication links 122, in some implementations, audio template provider 124 may take the form of an audio content database integrated with computing platform 102, or may be in direct communication with audio processing system 100 as shown by dashed communication link 128. Alternatively, in some implementations, audio sequence template 150 may be provided to audio processing system 100 by user 132.

It is also noted that although user system 130 is shown as a desktop computer in FIG. 1, that representation is provided merely as an example. More generally, user system 130 may be any suitable mobile or stationary computing device or system that implements data processing capabilities sufficient to implement the functionality ascribed to user system 130 herein. For example, in other implementations, user system 130 may take the form of a laptop computer, tablet computer, or smartphone, for example.

Audio integration software code 110, when executed by hardware processor 104 of computing platform 102, is configured to generate integrated audio sequence 160 based on audio sequence template 150 and descriptive data 134. Although the present application refers to audio integration software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts training platform 140 as a computer platform remote from audio processing system 100, that representation is also merely exemplary. More generally, audio processing system 100 may include one or more computing platforms, such as computer servers for example, which may form an interactively linked but distributed system, such as a cloud based system, for instance. As a result, hardware processor 104 and system memory 106 may correspond to distributed processor and memory resources within audio processing system 100, while training platform 140 may be a component of audio processing system 100 or may be implemented as a software module stored in system memory 106. In one implementation, computing platform 102 of audio processing system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Figure 2A:
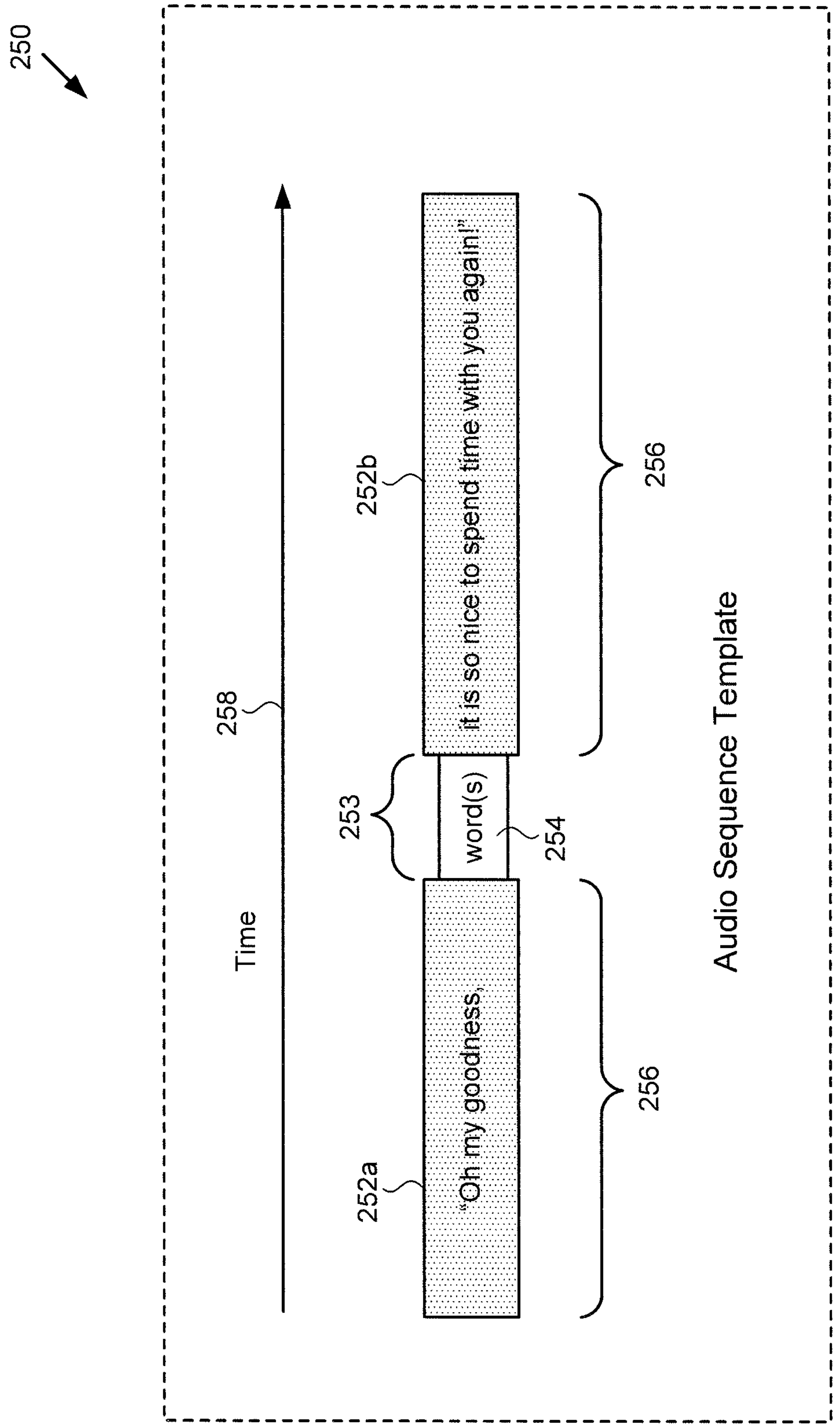
FIG. 2A shows a diagram of an audio sequence template for use in generating audio including emotionally expressive synthesized content, according to one implementation.

FIG. 2A shows a diagram of a portion of audio sequence template 250A, according to one implementation. According to the exemplary implementation shown in FIG. 2A, audio sequence template 250A includes first audio segment **252*a*, second audio segment 252*b*, and audio gap 253 between first audio segment 252*a* and second audio segment 252*b*. In addition, FIG. 2A shows timecode 258 of audio sequence template 250A, which may be used to timestamp or otherwise identify the start and/or end times of audio gap 253. Also shown in FIG. 2A is emotional tone or emotional context 256 characterizing first and second audio segments 252*a* and 252*b*, and one or more word(s) 254 to be inserted into audio gap 253**.

Figure 2B:
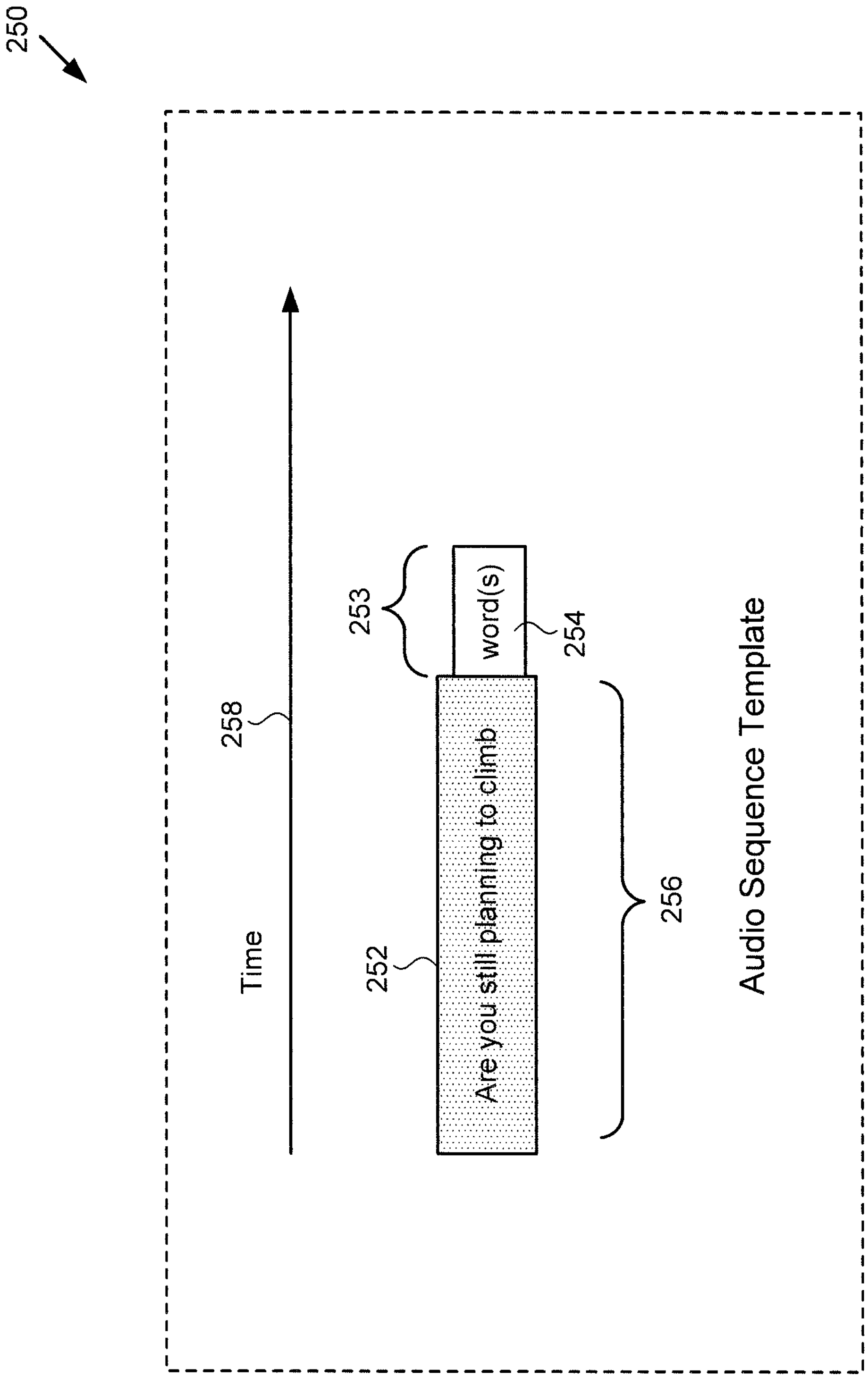
FIG. 2B shows a diagram of an audio sequence template for use in generating audio including emotionally expressive synthesized content, according to another implementation.

FIG. 2B shows a diagram of audio sequence template 250B for use in generating audio including emotionally expressive synthesized content, according to another implementation. Audio sequence template 250B differs from audio sequence template 250A in that audio sequence template 250B include only one audio segment 252 and audio gap 253 adjoins one end of audio segment 252. It is noted that audio segment 252 corresponds in general to either of first and second audio segments **252*a* and 252*b* in FIG. 2A. It is further noted that although FIG. 2B depicts audio gap 253 as following audio segment 252, in another implementation, audio gap 253 may precede audio segment 252, i.e., may adjoin the beginning of audio segment 252**.

Audio sequence template 250A/250B corresponds in general to audio sequence template 150, in FIG. 1, and those corresponding features may share any of the characteristics attributed to either feature by the present disclosure. In other words, although not shown in FIG. 1, audio sequence template 150 may include features corresponding respectively to audio segment 252 or first and second audio segment **252*a* and 252*b* characterized by emotional context or tone 256, audio gap 253, and timecode 258**.

Audio sequence template 150/250A/250B may be a portion of a prerecorded audio voiceover, for example, from which some audio content has been removed to produce audio gap 253. According to various implementations of the present inventive principles, hardware processor 104 is configured to execute audio integration software code 110 to synthesize word or words 254 for insertion into audio gap 253 based on the syntax of audio segment 252 or first and second audio segments **252*a* and 252*b*, further based on emotional tone or context 256 of at least one of audio segment 252 and first and second audio segments 252*a* and 252*b*, and still further based on descriptive data 134 describing word or words 254. That is to say, word or words 254 are synthesized by audio integration software code 110 to be syntactically correct as usage with audio segment 252 or first audio segment 252*a* and second audio segment 252*b*, while also agreeing in emotional tone with emotional tone or context 256 of audio segment 252 or one or both of first and second audio segments 252*a* and 252*b***.

It is noted that, as defined for the purposes of the present application, the phrases "emotional tone" and "emotional context" are equivalent and refer to the emotion expressed by the words included in audio segment 252 or first audio segment **252*a* and second audio segment 252*b***, as well as the speech cadence and vocalization with which those words are enunciated. Thus, emotional context or emotional tone may include the expression through speech pattern and vocal tone of emotional states such as happiness, sadness, anger, fear, excitement, affection, and dislike, to name a few examples.

It is further noted that, in some implementations, as shown in FIG. 1, descriptive data 134 may be provided by user 132. However, in other implementations, descriptive data 134 may be included in audio sequence template 150/250A/250B, and may be identified by audio integration software code 110, executed by hardware processor 104. For example, in some implementations, descriptive data 134 may include the last word in audio segment 252 or first audio segment 252*a* preceding audio gap 253, or one or more phonemes of such a word. In some of those implementations, descriptive data 134 may also include the first word in second audio segment 252*b* following audio gap 253, or one or more phonemes of that word. However, in some implementations, descriptive data 134 may include the first word in audio segment 252 following audio gap 253, or one or more phonemes of that word. Alternatively, or in addition, in some implementations, descriptive data 134 may include pronunciation exemplar 145 provided by user 132, or obtained directly from pronunciation database 144 by audio integration software code 110.

FIG. 3 shows exemplary audio integration software code 310 suitable for use by audio processing system 100 in FIG. 1, according to one implementation. As shown in FIG. 3, audio integration software code 310 includes training module 312, NN 370, text extraction module 314, and vocoder 316. In addition, FIG. 3 shows training data 342, descriptive data 334, audio sequence template 350, and integrated audio sequence 360. Also shown in FIG. 3 are text or phonemes 351 extracted from audio sequence template 350, and audio spectrogram or other acoustic representation 346 of integrated audio sequence 360.

Audio integration software code 310, training data 342, descriptive data 334, and integrated audio sequence 360 correspond respectively in general to audio integration software code 110, training data 142, descriptive data 134, and integrated audio sequence 160, in FIG. 1. That is to say, audio integration software code 110, training data 142, descriptive data 134, and integrated audio sequence 160 may share any of the characteristics attributed to respective audio integration software code 310, training data 342, descriptive data 334, and integrated audio sequence 360 by the present disclosure, and vice versa. Thus, although not shown explicitly shown in FIG. 1, audio integration software code 110 may include features corresponding to each of training module 312, NN 370, text extraction module 314, and vocoder 316.

In addition, audio sequence template 350 corresponds in general to audio sequence template 150/250A/250B in FIGS. 1 and 2. In other words, audio sequence template 350 may share any of the characteristics attributed to audio sequence template 150/250A/250B by the present disclosure, and vice versa. Thus, like audio sequence template 150/250A/250B, audio sequence template 350 may include features corresponding respectively to audio segment 252 or first audio segment 252*a* and second audio segment 252*b* (hereinafter "audio segment(s) 252/252*a*/252*b*"), each characterized by emotional context or tone 256, audio gap 253, and timecode 258.

FIG. 4 shows a more detailed diagram of NN 370, in FIG. 3, in the form of corresponding neural network cascade 470 (hereinafter "NN 370/470"), according to one exemplary implementation. In addition to NN 370/470, FIG. 4 shows descriptive data 434, audio sequence template 450, and text 451 extracted from audio sequence template 450. Audio sequence template 450 corresponds in general to audio sequence template 150/250A/250B/350, in FIGS. 1, 2, and 3. Consequently, audio sequence template 450 may share any of the characteristics attributed to corresponding audio sequence template 150/250A/250B/350 by the present disclosure, and vice versa. Descriptive data 434 corresponds in general to descriptive data 134/334 in FIGS. 1 and 3. As a result, descriptive data 434 may share any of the characteristics attributed to corresponding descriptive data 134/334 by the present disclosure, and vice versa. Moreover, text 451 corresponds in general to text 351 extracted from audio sequence template 150/250A/250B/350/450 by text extraction module 314, in FIG. 3.

As shown in FIG. 4, NN 370/470 includes text encoder 471 in the form of an RNN, such as a bi-directional Long Short-Term Memory (LSTM) or Gated Recurring Unit (GRU) network, for example, configured to receive descriptive data 134/334/434 and text 351/451 extracted from audio sequence template 150/250A/250B/350/450. The RNN of text encoder 471 is configured to encode text 351/451 corresponding to audio segment(s) 252/252*a*/252*b* and one or more words 254 described by descriptive data 134/334/434 into first sequence of vector representations 473 of text 351/451.

In addition, NN 370/470 includes audio encoder 472 having audio analyzer 472*a* configured to provide audio spectrogram 474 of audio sequence template 150/250A/250B/350/450 as an input to CNN 472*b* of audio encoder 472. In other words, audio analyzer 472*a* of audio encoder 472 is configured to generate audio spectrogram 474 corresponding to audio segment(s) 252/252*a*/252*b* and one or more words 254 described by descriptive data 134/334/434. For example, audio analyzer 472*a* may perform a text-to-speech (TTS) conversion of audio sequence template 150/250A/250B/350/450.

As further shown in FIG. 4, audio encoder 472 includes CNN 472*b* fed by audio analyzer 472*a*, and RNN 472*c* fed by CNN 472*b*. Like the RNN of text encoder 471, RNN 472*c* of audio encoder 472 may be a bi-directional LSTM or GRU network, for example. CNN 472*b* and RNN 472*c* of audio encoder 472 are configured to encode audio spectrogram 474 into second sequence of vector representations 476 of audio segment(s) 252/252*a*/252*b* and one or more words 254 described by descriptive data 134/334/434.

According to the exemplary implementation shown in FIG. 4, NN 370/470 includes text encoder 471 and audio encoder 472 configured to operate in parallel, and further includes audio decoder 478 fed by text encoder 471 via text attention block 475, and fed by audio encoder 472 via audio attention block 477. It is noted that audio decoder 478 may be implemented as an RNN in the form of a bi-directional LSTM or a GRU network. In addition, NN 370/470 includes post-processing CNN 479 fed by audio decoder 478 and providing audio spectrogram or other acoustic representation 446 of integrated audio sequence 160/360 as an output. Once trained, NN 370/470 is configured to use audio decoder 478 and post-processing CNN 479 fed by audio decoder 478 to generate audio spectrogram or other acoustic representation 346/446 of integrated audio sequence 360/460 based on a blend of first sequence of vector representations 473 and second sequence of vector representations 476.

Also shown in FIG. 4 is optional discriminator neural network 480 (hereinafter "discriminator NN 480"), which may be configured to evaluate audio spectrogram or other acoustic representation 346/446 of integrated audio sequence 160/360/460 during the training stage of NN 370/470. In some implementations, optional discriminator 480 may be used to detect a deficient instance of integrated audio sequence 160/360/460 as part of an automated rejection sampling process. In those implementations, rejection of integrated audio sequence 160/360/460 by discriminator 480 may result in generation of another integrated audio sequence 160/360/460, or may result in substitution of default audio, such as a generic voiceover, for example, for one or more words 254.

It is noted that, when utilized during training, optional discriminator NN 480 may be used by training module 312 to train NN 370/470 using objective function 482 designed to encourage generation of synthesized word or words 254 that agree in emotional tone or context 256 with one or more of audio segment(s) **252/252*a*/252*b* of audio sequence template 150/250A/250B/350/450, as well as being syntactically and grammatically consistent with audio segment(s) 252/252*a*/252*b***.

It is further noted that, in contrast to "regression to the mean" type objective functions used in the training of conventional speech synthesis solutions, the present novel and inventive solution may employ optional discriminator NN 480 and objective function 482 in the form of an adversarial objective function to bias integrated audio sequence 160/360 away from a "mean" value such that its corresponding acoustic representation 346/446 sounds convincing to the human ear. It is noted that NN 370/470 may be trained using objective function 482 including a syntax reconstruction loss term. However, in some implementations, NN 370/470 may be trained using objective function 482 including an emotional context loss term summed with a syntax reconstruction loss term.

As noted above, NN 470 corresponds in general to NN 370, in FIG. 3. Consequently, NN 370 may share any of the characteristics attributed to NN 470 by the present disclosure, and vice versa. In other words, like NN 470, NN 370 may include features corresponding respectively to text encoder 471, audio encoder 472, text attention block 475, audio attention block 477, audio decoder 478, post-processing CNN 479, and discriminator NN 480.

Figure 5:
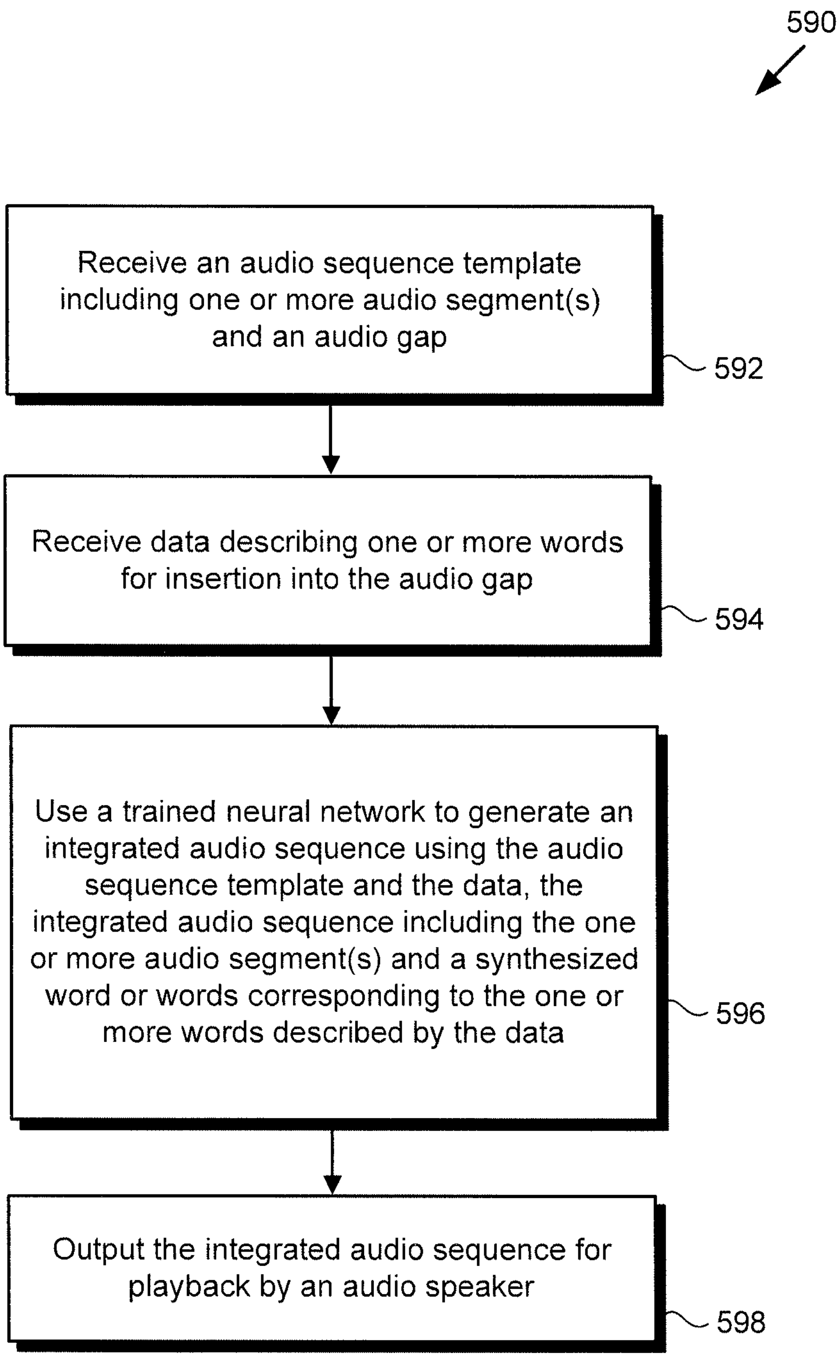
FIG. 5 shows a flowchart presenting an exemplary method for generating audio including emotionally expressive synthesized content, according to one implementation.

The functionality of audio processing system 100 including audio integration software code 110/310 will be further described by reference to FIG. 5 in combination with FIGS. 1, 2, 3, and 4. FIG. 5 shows flowchart 590 presenting an exemplary method for use by a system to generate audio including emotionally expressive synthesized content. With respect to the method outlined in FIG. 5, it is noted that certain details and features have been left out of flowchart 590 in order to not obscure the discussion of the inventive features in the present application.

As a preliminary matter, and as noted above, NN 370/470 is trained to synthesize expressive audio that sounds genuine to the human ear. NN 370/470 may be trained using training platform 140, training data 142, and training module 312 of audio integration software code 110/310. The goal of training is to fill in audio gap 253 in audio spectrogram 474 of audio sequence template 150/250A/250B/350/450 with a convincing utterance given emotional context or tone 256.

During training, discriminator NN 480 of NN 370/470 looks at the generated acoustic representation 346/446 and emotional context or tone 256 and determines whether it is a convincing audio synthesis. In addition, user 132 may provide descriptive data 134/334/434 and/or pronunciation exemplar 145, which can help NN 370/470 to appropriately pronounce synthesized word or words 254 for insertion into audio gap 253. For example, where word or words 254 include a phonetically challenging word, or a name or foreign word, pronunciation exemplar may be used as a guide track to guide NN 370/470 with the proper pronunciation of word or words 254.

In some implementations, sets of training data 142 may be produced using forced alignment to cut full sentences into individual words. A single sentence of training data 142, e.g., audio sequence template 150/250A/250B/350/450 may take the form of a full sentence with one or several word(s) cut out to produce audio gap 253. The goal during training is for NN 370/470 to learn to fill in audio gap 253 with synthesized words that are syntactically and grammatically correct as usage with audio segment(s) **252/252*a*/252*b*, while also agreeing with emotional context or tone 256 of audio segment(s) 252/252*a*/252*b***.

During training, validation of the learning process may be performed by user 132, who may utilize user system 130 to evaluate integrated audio sequence 160/360 generated during training and provide additional descriptive data 134/334/434 based on the accuracy with which integrated audio sequence 160/360 has been synthesized. However, in some implementations, validation of the learning can be performed as an automated process using discriminator NN 480. Once training is completed, audio integration software code 110/310 including NN 370/470 may be utilized in an automated process to generate integrated audio sequence 160/360 including emotionally expressive synthesized content as outlined by flowchart 590.

Referring now to FIG. 5 in combination with FIGS. 1, 2, 3, and 4, flowchart 590 begins with receiving audio sequence template 150/250A/250B/350/450 including audio segment(s) **252/252*a*/252*b* and audio gap 253 (action 592). As noted above, in some implementations, audio sequence template 150/250A/250B/350/450 may be a portion of a prerecorded audio voiceover, for example, from which some audio content has been removed to produce audio gap 253**.

Audio sequence template 150/250A/250B/350/450 may be received by audio integration software code 110/310 of audio processing system 100, executed by hardware processor 104. As shown in FIG. 1, in one implementation, audio sequence template 150/250A/250B/350/450 may be received by audio processing system 100 from audio template provider 124 via communication network 120 and network communication links 122, or directly from audio template provider 124 via communication link 128.

Flowchart 590 continues with receiving descriptive data 134/334/434 describing one or more words 254 for insertion into audio gap 253 (action 594). Descriptive data 134/334/434 may be received by audio integration software code 110/310 of audio processing system 100, executed by hardware processor 104. As discussed above, in some implementations, as shown in FIG. 1, descriptive data 134/334/434 may be provided by user 132.

However, in other implementations, descriptive data 134/334/434 may be included in audio sequence template 150/250A/250B/350/450 and may be identified by audio integration software code 110/310, executed by hardware processor 104. For example, in some implementations, descriptive data 134/334/434 may include the last word in audio segment 252 or first audio segment **252*a* preceding audio gap 253, or one or more phonemes of such a word. In some of those implementations, descriptive data 134/334/434 may also include the first word in second audio segment 252*b* following audio gap 253, or one or more phonemes of that word. Alternatively, in some implementations, descriptive data 134/334/434 may include the first word in audio segment 252 following audio gap 253, or one or more phonemes of that word. Alternatively, or in addition, in some implementations, descriptive data 134/334/434 may include pronunciation exemplar 145 provided by user 132, or received directly from pronunciation database 144 by audio integration software code 110. Thus, in various implementations, descriptive data 134/334/434 may include pronunciations from a pronunciation NN model of pronunciation database 144 and/or linguistic features from audio segment(s) 252/252*a*/252***b*.

In some implementations, flowchart 590 can conclude with using trained NN 370/470 to generate integrated audio sequence 160/360 using audio sequence template 150/250A/250B/350/450 and descriptive data 134/334/434, where integrated audio sequence 160/360 includes audio segment(s) 252/252*a*/252*b* and one or more synthesized words 254 corresponding to the words described by descriptive data 134/334/343 (action 596). Action 596 may be performed by audio integration software code 110/310, executed by hardware processor 104, and using trained NN 370/470.

By way of summarizing the performance of trained NN 370/470 with reference to the specific implementation of audio sequence template 250A, in FIG. 2A, it is noted that trained NN 370/470 utilizes audio spectrogram 474 of audio sequence template 150/250A/350/450 that includes the spectrogram of the left context, i.e., first audio segment 252*a*, a TTS generated word or words described by descriptive data 134/334/434, and the right context, i.e., second audio segment 252*b*. In addition, NN 370/470 receives text input 351/451 (which may include phonemes input). Trained NN 370/470 encodes the inputs in a sequential manner with text encoder 471 and audio encoder 472. Trained NN 370/470 may then form output audio spectrogram or other acoustic representation 346/446 of integrated audio sequence 160/360 including synthesized word or words 254, sequentially with audio decoder 478.

Referring to text encoder 471, in one implementation, text encoder 471 may begin with a 256-dimensional text embedding, thereby converting text 351/451 into a sequence of 256-dimensional vectors as first sequence of vector representations 473, also referred to herein as "encoder states." It is noted that the length of first sequence of vector representations 473 is determined by the length of input text 351/451. In some implementations, text 351/451 may be converted into phonemes or other phonetic pronunciations, while in other implementations, such conversion of text 351/451 may not occur. Additional linguistic features of audio sequence template 150/250A/350/450 may also be encoded together with text 351/451, such as parts of speech, e.g., noun, subject, verb, and so forth.

Audio encoder 472 includes CNN 472*b* over input audio spectrogram 474, followed by RNN encoder 472*c*. That is to say, audio encoder 472 takes audio sequence template 150/250A/350/450, converts it into audio spectrogram 474, processes audio spectrogram 474 using CNN 472*b* and RNN 472*c*, and outputs a sequence of 256-dimensional vectors as second sequence of vector representations 476.

Audio decoder 478 uses two sequence-to-sequence attention mechanisms, shown in FIG. 4 as text attention block 475 and audio attention block 477, that focus on a few of the input audio and text states in order to decode the input into the generated audio. Text attention block 475 processes the first sequence of vector representations 473 and the current state of audio decoder 478 to form a blended state which summarizes what audio decoder 478 should be paying attention to.

Similarly, audio attention block 477 processes second sequence of vector representations 476 and forms a blended state that summarizes the audio that audio decoder 478 should be paying attention to. Audio decoder 478 combines the blended states from each of text attention block 475 and audio attention block 477 by combining, i.e., concatenating, the vectors of both blended states. Audio decoder 478 then decodes the combined state, updates its own state, and the two attention mechanisms are processed again. This process may continue sequentially until the entire speech is synthesized.

As noted above, audio decoder 478 may be implemented as an RNN (e.g., LSTM or GRU). According to the exemplary implementation shown in FIG. 4, the output of audio decoder 478 is passed through post-processing CNN 479. The output of post-processing CNN 479 is audio spectrogram or other acoustic representation 346/446 of integrated audio sequence 160/360. Audio spectrogram or other acoustic representation 346/446 of integrated audio sequence 160/360 may then be converted into raw audio samples via vocoder 316. It is noted that vocoder 316 may be implemented using the Griffin-Lim algorithm known in the art, or may be implemented as a neural vocoder.

Action 596 results in generation of integrated audio sequence 160/360 including synthesized word or words 254. Moreover, and as discussed above, word or words 254 are synthesized by audio integration software code 110/310 to be syntactically and grammatically correct as usage with audio segment(s) 252/252*a*/252*b*, while also agreeing in emotional tone with emotional tone or context 256 of one or more of audio segment(s) 252/252*a*/252*b*. Once produced using audio integration software code 110/310, integrated audio sequence 160/360 may be stored locally in system memory 106 of audio processing system 100, or may be transmitted, via communication network 120 and network communication links 122, to user system 130.

In some implementations, as shown in FIG. 5, flowchart 590 may continue with hardware processor 104 executing audio integration software code 110/310 to output integrated audio sequence 160/360 for playback by audio speaker 108 of audio processing system 100 (action 598). Alternatively, in some implementations, action 598 may include transmitting integrated audio sequence 160/360 to user system 130 for playback locally on user system 130 by audio speaker 138.

Thus, the present application discloses automated systems and methods for generating audio including emotionally expressive synthesized content. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An audio processing system comprising:

a computing platform including a hardware processor and a system memory;

a software code stored in the system memory, the software code including a trained neural network;

the hardware processor configured to execute the software code to:

receive an audio sequence template including at least one audio segment and an audio gap;

receive data describing at least one word for insertion into the audio gap; and use the trained neural network to generate an integrated audio sequence using the audio sequence template and the data, the integrated audio sequence including the at least one audio segment and at least one synthesized word corresponding to the at least one word described by the data.

2. The audio processing system of claim 1, wherein the trained neural network is trained using an objective function having a syntax reconstruction loss term.

3. The audio processing system of claim 1, wherein the trained neural network is trained using an objective function having an emotional context loss term summed with a syntax reconstruction loss term.

4. The audio processing system of claim 1, wherein the at least one synthesized word is syntactically correct as usage with the at least one audio segment, and agrees in emotional tone with at least one audio segment.

5. The audio processing system of claim 1, wherein the hardware processor is further configured to execute the software code to output the integrated audio sequence for playback by an audio speaker.

6. The audio processing system of claim 1, wherein the trained neural network comprises a text encoder and an audio encoder configured to operate in parallel, and an audio decoder fed by the text encoder and the audio encoder.

7. The audio processing system of claim 6, wherein the text encoder comprises a recurrent neural network (RNN) configured to encode text corresponding respectively to the at least one audio segment and the at least one word described by the data into a first sequence of vector representations of the text.

8. The audio processing system of claim 6, wherein the audio encoder comprises an audio analyzer configured to generate an audio spectrogram corresponding to the at least one audio segment and the at least one word described by the data.

9. The audio processing system of claim 8, wherein the audio encoder further comprises a convolutional neural network (CNN) fed by the audio analyzer, and an RNN fed by the CNN, the CNN and the RNN configured to encode the audio spectrogram into a second sequence of vector representations of the first audio segment and the at least one word described by the data.

10. The audio processing system of claim 9, wherein the audio decoder comprises an RNN, and wherein the trained neural network is configured to use the audio decoder and a post-processing CNN fed by the audio decoder to generate an acoustic representation of the integrated audio sequence based on a blend of the first sequence of vector representations and the second sequence of vector representations.

11. A method for use by an audio processing system including a computing platform having a hardware processor and a system memory storing a software code including a trained neural network, the method comprising:

receiving, by the software code executed by the hardware processor, an audio sequence template including at least one audio segment and an audio gap;

receiving, by the software code executed by the hardware processor, data describing at least one word for insertion into the audio gap; and using the trained neural network, by the software code executed by the hardware processor, to generate an integrated audio sequence using the audio sequence template and the data, the integrated audio sequence including the at least one audio segment and at least one synthesized word corresponding to the at least one word described by the data.

12. The method of claim 11, wherein the trained neural network is trained using an objective function having a syntax reconstruction loss term.

13. The method of claim 11, wherein the trained neural network is trained using an objective function having an emotional context loss term summed with a syntax reconstruction loss term.

14. The method of claim 11, wherein the at least one synthesized word is syntactically correct as usage with the at least one audio segment, and agrees in emotional tone with the at least one audio segment.

15. The method of claim 11, further comprising output of the integrated audio sequence, by the software code executed by the hardware processor, for playback by an audio speaker.

16. The method of claim 11, wherein the trained neural network comprises a text encoder and an audio encoder configured to operate in parallel, and an audio decoder fed by the text encoder and the audio encoder.

17. The method of claim 16, wherein the text encoder comprises a recurrent neural network (RNN) configured to encode text corresponding respectively to the at least one audio segment and the at least one word described by the data into a first sequence of vector representations of the text.

18. The method of claim 16, wherein the audio encoder comprises an audio analyzer configured to generate an audio spectrogram corresponding to the at least one audio segment and the at least one word described by the data.

19. The method of claim 18, wherein the audio encoder further comprises a convolutional neural network (CNN) fed by the audio analyzer, and an RNN fed by the CNN, the CNN and the RNN configured to encode the audio spectrogram into a second sequence of vector representations of the at least one audio segment and the at least one word described by the data.

20. The method of claim 19, wherein the audio decoder comprises an RNN, and wherein the trained neural network is configured to use the audio decoder and a post-processing CNN fed by the audio decoder to generate an acoustic representation of the integrated audio sequence based on a blend of the first sequence of vector representations and the second sequence of vector representations.

* * * * *